(12) United States Patent
Jachimski

(10) Patent No.: US 7,165,961 B2
(45) Date of Patent: Jan. 23, 2007

(54) COMPRESSION MOLDING APPARATUS WITH QUICK CHANGE MOLDS

(75) Inventor: Scott A. Jachimski, Centerville, OH (US)

(73) Assignee: Alpha Technological Services LLC, Vandalia, OH (US)

( * ) Notice: Subject to any disclaimer, the term of this patent is extended or adjusted under 35 U.S.C. 154(b) by 417 days.

(21) Appl. No.: 10/862,981

(22) Filed: Jun. 8, 2004

(65) Prior Publication Data
US 2005/0271763 A1   Dec. 8, 2005

(51) Int. Cl.
B29C 43/50   (2006.01)
B29C 51/08   (2006.01)

(52) U.S. Cl. ............... 425/193; 425/195; 425/345; 425/398; 425/418; 425/809

(58) Field of Classification Search ............... 425/193, 425/195, 344–345, 398, 418, 809
See application file for complete search history.

(56) References Cited

U.S. PATENT DOCUMENTS

| | | | |
|---|---|---|---|
| 4,343,754 A | 8/1982 | Wilde et al. | |
| 4,497,765 A | 2/1985 | Wilde et al. | |
| 5,557,999 A | 9/1996 | Smith et al. | |
| 5,692,851 A * | 12/1997 | Pace | 403/31 |
| 6,074,583 A | 6/2000 | Ingram | |

* cited by examiner

Primary Examiner—Yogendra N. Gupta
Assistant Examiner—Thu Khanh T. Nguyen
(74) Attorney, Agent, or Firm—Jacox, Meckstroth & Jenkins

(57) ABSTRACT

Compression molding apparatus for molding plastic closures for containers includes a rotary turret having a vertical axis and supporting circumferentially spaced and axially moveable opposing plungers each carrying a compression mold member. Each mold member is attached to its corresponding plunger by a quick change locking coupler including a cylinder with circumferentially spaced holes supporting balls for radial movement. Each mold member has an axially projecting stud with an enlarged head portion projecting into the cylinder, and a cup-shaped piston surrounds the cylinder and has a recess for receiving the balls in a released position. A spring urges the piston to a locked position with the balls engaging the stud, and a housing is recessed within the plunger to support the piston for axial movement against the spring to a released position in response to pressurized fluid received within the housing through a passage within the housing and plunger.

18 Claims, 2 Drawing Sheets

COMPRESSION MOLDING APPARATUS WITH QUICK CHANGE MOLDS

BACKGROUND OF THE INVENTION

This invention relates to rotational compression molding apparatus commonly used for producing plastic caps or closures for containers, such as, for example, the apparatus disclosed in U.S. Pat. No. 4,343,754, U.S. Pat. No. 4,497,765, U.S. Pat. No. 5,557,999 and U.S. Pat. No. 6,074,583, the disclosures of which are herein incorporated by reference. Such apparatus is commonly used for high volume production of plastic snap-on and screw-on caps or closures for containers for soft drinks or non-carbonated beverages, water, juices, dairy products and for some non-food containers such as oil containers. On most rotational compression molding apparatus, it is desirable or necessary to change the male and female mold components periodically in order to produce plastic closures of different designs or for replacing or repairing the mold components.

For example, in one rotational compression molding apparatus, the rotational turret supports over fifty male molds and opposing female molds which are secured to axially moveable upper and lower opposing plungers, as disclosed in the above-mentioned patents. The time required for removing and replacing all of the mold components is over four hours, and during this time, the molding machine or apparatus is not producing any plastic closures. In view of such long down time, it has been found desirable to provide the molding apparatus with a quick change tooling system for quickly removing and replacing the mold components. For example, FIGS. 11–13 of above-mentioned U.S. Pat. No. 6,074,583 disclose a laterally sliding U-shaped yoke which is carried by the supporting plunger for the female mold component, and the yoke engages diametrically opposed slots or grooves within the female mold component for retaining the mold component.

SUMMARY OF THE INVENTION

The present invention is directed to compression molding apparatus for molding plastic closures for containers and which incorporates an improved quick change coupling system for positively and precisely connecting each mold component to its corresponding support plunger which is supported for axial movement. In accordance with one embodiment of the invention, a compression female mold and/or male mold, herein referred to as mold member, is rigidly connected to its corresponding support plunger by a quick-release locking coupler. The coupler includes a cylinder having peripherally spaced holes supporting a plurality of circumferentially spaced balls for corresponding radial movement, and the cylinder receives an axially projecting stud attached to the mold member and having a tapered base portion and an enlarged head portion. A cup-shaped piston surrounds the cylinder and has a recess for receiving the balls in a released position, and a compression spring urges the piston axially to a locked position with the balls engaging the head portion of the stud. A housing is recessed within a counterbore in the plunger and supports the piston for axial movement, and the piston is moved axially against the spring to a release position with the balls received within the recess. Preferably, the piston is moved axially within the housing in response to pressurized air directed into the housing through a passage within the supporting plunger.

Other features and advantages of the invention will be apparent from the following description, the accompanying drawings and the appended claims.

DESCRIPTION OF THE PREFERRED EMBODIMENT

Figure 1:
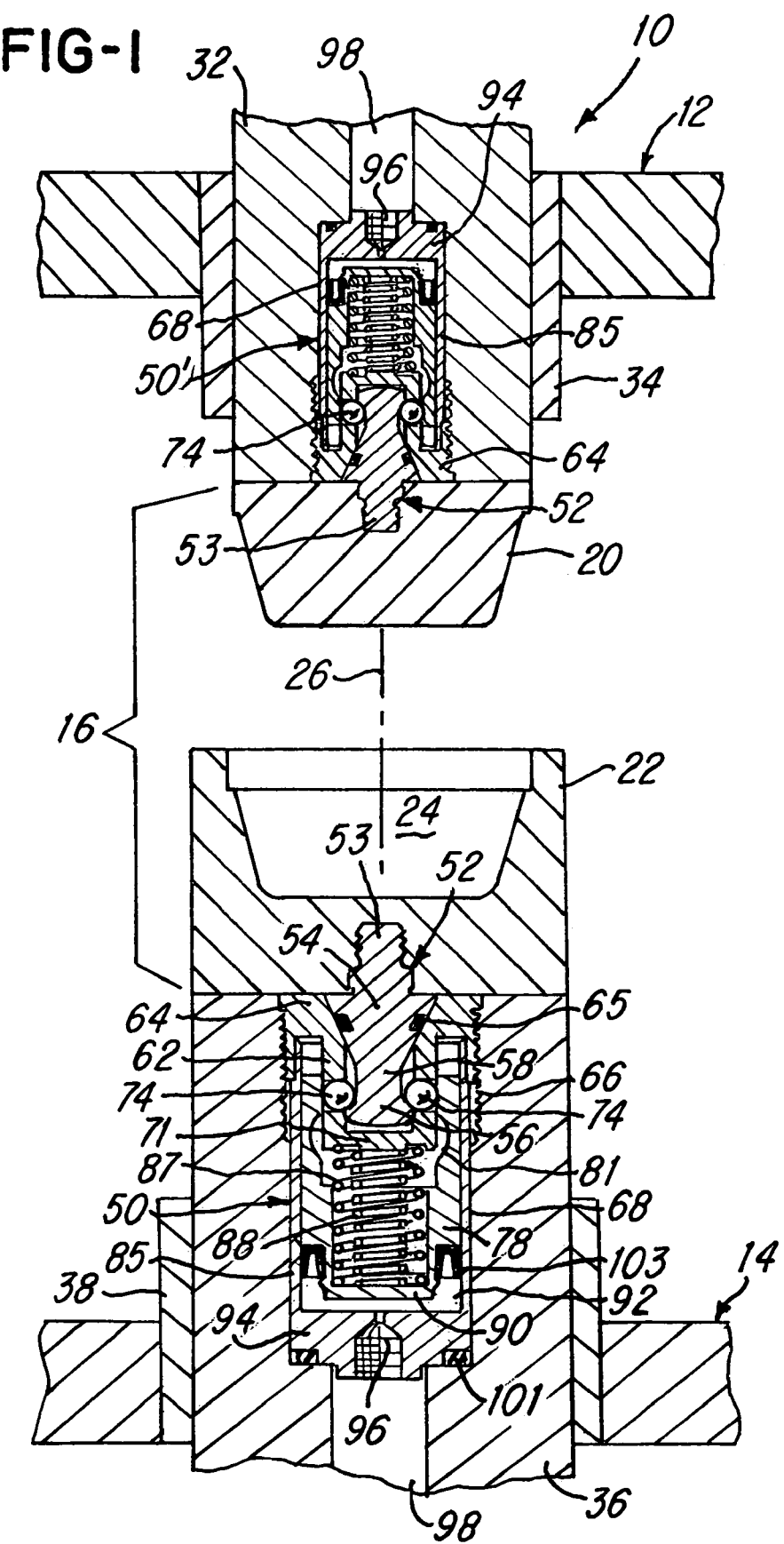
FIG. 1 is a fragmentary axial section of male and female mold members for compression molding of a plastic closure for a container and showing the mold members attached to their supporting plungers by quick-release locking couplers in accordance with the invention.

FIG. 1 illustrates compression molding apparatus 10 which is constructed similar to that shown in above mentioned U.S. Pat. No. 6,074,583 and includes a rotary turret supported for rotation on a vertical axis. The turret has an upper support plate 12 and a lower support plate 14 which rotate together and support peripherally spaced mold sets 16 for compression molding cup-like plastic caps or closures for containers or sealing liners for the closures, as disclosed in above-mentioned U.S. Pat. No. 4,497,765. Each mold set 16 includes a male mold member or core 20 and a female mold member 22 defining a cavity 24 for receiving the male mold member 20.

Each set of mold members 20 and 22 have a common vertical axis 26, and the male mold member 20 is carried by a vertical cylindrical plunger 32 supported for vertical movement within a cylindrical bearing 34 secured to the upper support plate 12. The female mold member 22 is supported and carried by a cylindrical plunger 36 supported for vertical movement on the axis 26 by cylindrical bearing 38 secured to the lower support plate 14. The operation of the compression molding machine or apparatus 10, including the opening and closing of the mold members 20 and 22 to perform compression molding of cup-like plastic closures for containers, is well known in the art, and the specific details of construction and operation of the compression molding apparatus are disclosed in the above-mentioned U.S. patents.

In accordance with the present invention, each of the female mold members 22 is releasably coupled and locked to its supporting plunger 36 by a locking coupler 50, preferably of the type manufactured and sold by Edward D. Segen & Co., LLC of Milford, Conn. and referred to in its catalog as a "Quick-Change Cylinder Lock". Each of the couplers 50 includes a metal knob or stud 52 having a portion 53 threaded into the center of the female mold member 22 and projecting downwardly from the mold member. Each stud 52 has a tapered or frusto-conical base portion 54 integrally connected to an enlarged head portion 56 by a neck portion 58 of reduced diameter.

The coupler 50 also includes a female portion in the form of a cup-shaped cylinder 62 having an annular upper end portion 64 with an internal tapered surface which mates with the tapered outer surface on the base portion 54 of the stud 52. A resilient sealing ring 65 is carried by the stud 52 to form a seal with the cylinder 62. The end portion 64 of the cylinder 62 also has external threads which mate with internal threads 66 within the upper end portion of a counterbore 68 formed in the upper end portion of the plunger 36. The cylinder 62 also has a bottom end wall 71 and defines a cavity for receiving the enlarged head portion 56 of the stud 52. A plurality of hardened steel locking balls 74 are retained within corresponding circumferentially spaced holes within the cylinder 62 for corresponding radial movement.

Figure 2:
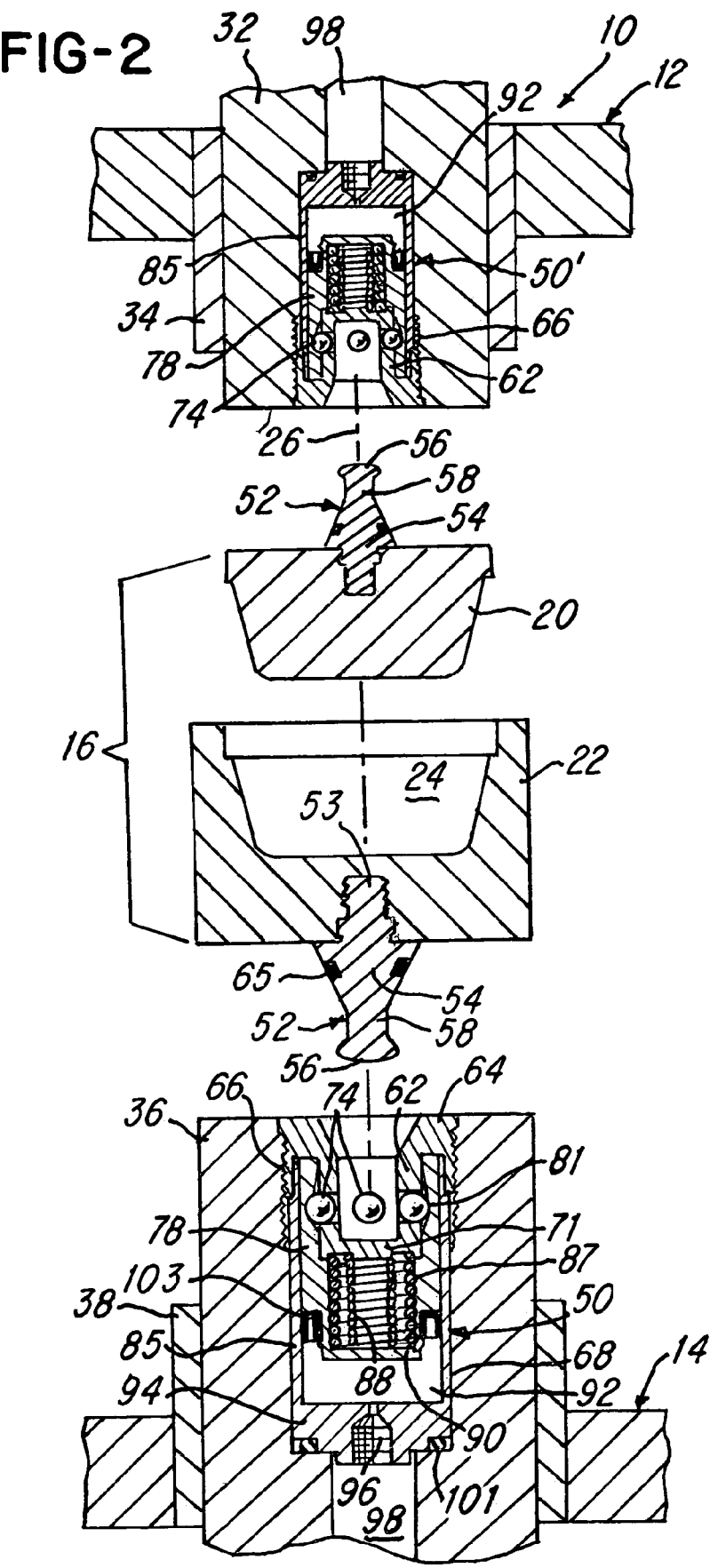
FIG. 2 is an exploded fragmentary axial section of the mold members and locking couplers shown in FIG. 1.

A cup-shaped piston 78 surrounds the cylinder 62 and has a circumferentially extending internal groove or recess 81 for receiving the balls 74 in retracted positions when the piston 78 is in its released position (FIG. 2). A cylindrical cup-shaped housing 85 surrounds the piston 78 and has an upper end portion secured or bonded by adhesive to the annular portion 64 of the cylinder 62. The housing 85 confines and supports the piston 78 for axial movement between an upper released position (FIG. 2) with the balls retracted and a lower lock position (FIG. 1) when the balls 74 are cammed radially inwardly to engage the head portion 56 of the stud 52. A set of concentric compression springs 87 and 88 extend between the bottom end wall 71 of the cylinder 62 and a bottom end wall 90 of the piston 78 and normally urge the piston 78 downwardly to the lock position (FIG. 1) of the coupler 50.

When it is desired to release the stud 52 from the cylinder 62, pressurized fluid or air is introduced into a chamber 92 defined below the piston 78 and a bottom end wall 94 of the housing 85 to force the piston upwardly against the bias of the springs 87 and 88, allowing the stud 52 and the female mold member 22 to be lifted and removed from the cylinder 62, as shown in FIG. 2. The pressurized air is supplied to the chamber 92 through a center port 96 within the end wall 94 of the housing 85 and connected to a fluid or air passage 98 within the plunger 36. A resilient sealing ring 101 forms a fluid-type seal between the housing 85 and the plunger 36, and a resilient sealing ring 103 forms a sliding fluid-type seal between the piston 78 and the housing 85.

Each male mold or core member 20 is attached to its supporting plunger 32 by a quick release locking coupler 50' which is constructed the same as the locking coupler 50 except that it is smaller in diameter. Accordingly, the same reference numbers used to identify the components of the locking coupler 50 are used to identify the corresponding components of the smaller locking coupler 50'. It should be understood that the male mold member 20 and the female mold member 22 are shown in general configuration, but may be of any specific configuration depending upon the specific type and shape of the plastic cap or closure to be compression molded. For example, if it is desired to mold a closure having internal threads, axially extending locating pins may be used between the plungers 32 and 36 and the corresponding mold members 20 and 22 to prevent rotation of the mold members relative to their supporting plungers when the plunger 32 and male mold member 20 are rotated in order to unthread the male mold member 20 from the molded cap or closure confined within the female mold member 22.

From the drawings and the above description, it is apparent that compression molding apparatus having mold members connected to their supporting plungers with locking couplers in accordance with the invention, provides desirable features and advantages. For example, the locking couplers 50 and 50' provide for accurately and quickly positioning the mold members with precision alignment on their supporting plungers and for positively and quickly locking the mold members to the plungers. As a result, all of the mold members on a turret of a compression molding machine or apparatus may be quickly removed for repair and/or replacement, and the repaired or different mold members may be quickly reattached in order to minimize down time of the compression molding machine or apparatus. That is, simply by adding pressurized fluid or air to the each passage 98 within the plungers 32 and 36, each set 16 of mold members are instantly released so that they may be removed from their supporting plungers. Similarly, after pressurized air is supplied to the chambers 92 through the passages 98, the studs 52 are inserted into their corresponding cylinders 62, and the mold members are instantly locked to their supporting plungers as soon as the air pressure is released from the passages 98.

While the method and form of molding apparatus herein described constitutes a preferred embodiment of the invention, it is to be understood that the invention is not limited to the precise method and form of molding apparatus described, and that changes may be made therein without departing from the scope and spirit of the invention as defined in the appended claims.

What is claimed is:

1. In apparatus adapted for compression molding cup-like plastic closures for containers or liners for the closures, said apparatus including a turret supported for rotation on an axis, a plurality of circumferentially spaced plungers supported by said turret for independent movement on corresponding axes parallel to said axis of said turret, and a mold member carried by each said plunger for axial movement therewith, the improvement comprising a quick-change locking coupler recessed within each said plunger and securing the corresponding said mold member to said plunger, each said locking coupler including a cylinder having peripherally spaced holes supporting a plurality of circumferentially spaced balls for corresponding radial movement, an axially projecting stud on said mold member and having an enlarged head portion, a cup-shaped piston surrounding said cylinder and having a recess for receiving said balls in a released position, a spring urging said piston axially to a locked position with said balls engaging said head portion of said stud, a housing confined within said plunger and supporting said piston for axial movement, and said piston is movable axially against said spring to a released position where said balls are received within said recess.

2. Apparatus as defined in claim 1 and including a fluid passage within said plunger and said housing for supplying pressurized fluid to said housing for moving said piston to said released position.

3. Apparatus as defined in claim 1 wherein said mold member comprises a male mold core, and said stud is threadably connected to said mold core.

4. Apparatus as defined in claim 1 wherein said mold member comprises a female mold defining a cavity adapted to receive a predetermined volume of plastics material, and said stud is threadably connected to said female mold.

5. Apparatus as defined in claim 1 wherein said cylinder includes an end portion threadably engaging a bore within said plunger.

6. Apparatus as defined in claim 1 wherein said cylinder and said housing extend within a counterbore within said plunger.

7. In apparatus adapted for compression molding cup-like plastic closures for containers or liners for the closures, said apparatus including a turret supported for rotation on an axis, a plurality of circumferentially spaced plungers supported by said turret for independent movement on corresponding axes parallel to said axis of said turret, and a mold member carried by each said plunger for axial movement therewith, the improvement comprising a quick-change locking coupler recessed within each said plunger and securing the corresponding said mold member to said plunger, each said locking coupler including a cylinder having peripherally spaced holes supporting a plurality of circumferentially spaced balls for corresponding radial movement, an axially projecting stud on said mold member and having an enlarged head portion, a cup-shaped piston surrounding said cylinder and having a recess for receiving said balls in a released position, a spring urging said piston axially to a locked position with said balls engaging said head portion of said stud, a housing confined within said plunger and supporting said piston for axial movement, and a fluid passage within said plunger and said housing for supplying pressurized fluid to said housing for moving said piston axially against said spring to a released position where said balls are received within said recess.

8. Apparatus as defined in claim 7 wherein said mold member comprises a male mold core, and said stud is threadably connected to said mold core.

9. Apparatus as defined in claim 7 wherein said mold member comprises a female mold defining a cavity adapted to receive a predetermined volume of plastics material, and said stud is threadably connected to said female mold.

10. Apparatus as defined in claim 7 wherein said cylinder includes an end portion threadably engaging a bore within said plunger.

11. Apparatus as defined in claim 7 wherein said cylinder and said housing extend within a counterbore within said plunger.

12. Apparatus as defined in claim 7 wherein said spring comprises concentric compression springs extending between said cylinder and said piston.

13. In apparatus adapted for compression molding cup-like plastic closures for containers or liners for the closures, said apparatus including at least one elongated plunger having an axis and supported for axial movement, and a mold member carried by said plunger for axial movement therewith, the improvement comprising a quick-change locking coupler recessed within said plunger and securing said mold member to said plunger, said locking coupler including a cylinder having peripherally spaced holes supporting a plurality of circumferentially spaced balls for corresponding radial movement, an axially projecting stud on said mold member and having an enlarged head portion, a cup-shaped piston surrounding said cylinder and having a recess for receiving said balls in a released position, a spring urging said piston axially to a locked position with said balls engaging said head portion of said stud, a housing confined within said plunger and supporting said piston for axial movement, and said piston is movable axially against said spring to a released position where said balls are received within said recess.

14. Apparatus as defined in claim 13 and including a fluid passage within said plunger and said housing for supplying pressurized fluid to said housing for moving said piston to said released position.

15. Apparatus as defined in claim 13 wherein said mold member comprises a male mold core, and said stud is threadably connected to said mold core.

16. Apparatus as defined in claim 13 wherein said mold member comprises a female mold defining a cavity adapted to receive a predetermined volume of plastics material, and said stud is threadably connected to said female mold.

17. Apparatus as defined in claim 13 wherein said cylinder includes an end portion threadably engaging a bore within said plunger.

18. Apparatus as defined in claim 13 wherein said cylinder and said housing extend within a counterbore within said plunger.

\* \* \* \* \*